(12) United States Patent
Nakai et al.

(10) Patent No.: US 10,128,027 B2
(45) Date of Patent: *Nov. 13, 2018

(54) ELECTRICAL WIRE HOLDER

(71) Applicant: SUMITOMO WIRING SYSTEMS, LTD., Yokkaichi-shi, Mie (JP)

(72) Inventors: Hirokazu Nakai, Yokkaichi (JP); Masashi Fujiki, Yokkaichi (JP); Hiroyuki Yoshikawa, Yokkaichi (JP)

(73) Assignee: SUMITOMO WIRING SYSTEMS, Ltd., Mie (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,532

(22) Filed: Nov. 3, 2016

(65) Prior Publication Data

US 2017/0076841 A1    Mar. 16, 2017

Related U.S. Application Data

(63) Continuation of application No. 14/455,056, filed on Aug. 8, 2014, now Pat. No. 9,520,214.

(30) Foreign Application Priority Data

Aug. 9, 2013    (JP) ................... 2013-166437

(51) Int. Cl.
| | |
|---|---|
| *H01B 17/56* | (2006.01) |
| *H01B 17/58* | (2006.01) |
| *B60R 16/02* | (2006.01) |
| *H02G 3/04* | (2006.01) |
| *F16L 3/23* | (2006.01) |
| *F16L 7/00* | (2006.01) |

(52) U.S. Cl.
CPC ....... *H01B 17/583* (2013.01); *B60R 16/0215* (2013.01); *F16L 3/23* (2013.01); *F16L 7/00* (2013.01); *H02G 3/0418* (2013.01); *H02G 3/0481* (2013.01)

(58) Field of Classification Search
CPC .................................................. H01B 17/583
USPC .................................................. 174/74 R, 83
See application file for complete search history.

(56) References Cited

U.S. PATENT DOCUMENTS

| | | |
|---|---|---|
| 3,627,904 A | 12/1971 | Milne |
| 3,889,909 A | 6/1975 | Koscik |

(Continued)

FOREIGN PATENT DOCUMENTS

| | | |
|---|---|---|
| JP | 2013-067292 A | 4/2013 |
| WO | 2013115406 A1 | 8/2013 |

OTHER PUBLICATIONS

Aug. 23, 2016 Office Action issued in Japanese Patent Application No. 2013-166437.

*Primary Examiner* — Chau N Nguyen
(74) *Attorney, Agent, or Firm* — Oliff PLC

(57) ABSTRACT

There is provided an electric wire holder for holding electric wires connected to terminal fittings at end portions of the wires, the holder configured to attach to a shielding pipe to cover an edge of the shielding pipe into which the electric wires are inserted and from which the terminal fittings and a portion of the electric wires are drawn out to an outside of the shielding pipe, the holder comprising: a first holding piece configured to hold the portion of the electric wires that is drawn out from the shielding pipe and to fix a draw-out position of the terminal fittings.

15 Claims, 9 Drawing Sheets

(56) References Cited

U.S. PATENT DOCUMENTS

| | | | |
|---|---|---|---|
| 4,535,196 A | 8/1985 | Milne | |
| 4,575,133 A | 3/1986 | Mattel | |
| 4,836,580 A * | 6/1989 | Farrell | F16L 25/0045 |
| | | | 285/133.11 |
| 4,948,180 A * | 8/1990 | Usui | F16L 37/0985 |
| | | | 285/319 |
| D375,250 S | 11/1996 | Dollins | |
| 5,685,345 A | 11/1997 | Gieseke et al. | |
| 6,951,491 B2 | 10/2005 | Sakaguchi et al. | |
| 7,029,325 B2 | 4/2006 | Khemakhem et al. | |
| 7,094,970 B2 | 8/2006 | Kihira | |
| 7,745,740 B2 | 6/2010 | Smith | |
| 9,520,214 B2 * | 12/2016 | Nakai | B60R 16/0215 |
| 2011/0227333 A1 | 9/2011 | Stark | |

\* cited by examiner

ELECTRICAL WIRE HOLDER

This application is a Continuation of U.S. application Ser. No. 14/455,056, filed Aug. 8, 2014, which claims benefit to Japanese Application 2013-166437, filed Aug. 9, 2013. The disclosures of the prior applications are hereby incorporated by reference herein in their entirety.

BACKGROUND

Conventionally, in a hybrid vehicle and the like, a battery and an inverter are connected by a wire harness including a plurality of electric wires. Generally, this wire harness is subject to shielding, and, for example, the wire harness may be passed through the inside of a long shielding pipe (pipe made of aluminum) disposed under the floor of the vehicle as shown in JP 2013-67292A.

TECHNICAL PROBLEM

The electric wires passed through the inside of the shielding pipe are drawn out to the outside from the front end of the shielding pipe, and are connected to devices such as an inverter with terminal fittings attached to the end portion thereof. Incidentally, the distances from the front end of the shielding pipe to the terminal fittings differ depending on the terminal fitting, and the positions of the terminal fittings drawn out from the shielding pipe may be set individually.

The shielding pipe is disposed along a predetermined route under the floor of a vehicle, and therefore, is bent into a predetermined shape. The electric wires are inserted into the shielding pipe prior to the bending processing. That is, after the electric wires are inserted into a straight shielding pipe and the positions of the drawn-out terminal fittings are respectively determined, the bending processing is performed.

However, in the process for bending the shielding pipe, there is a problem in that the electric wires are drawn into the inside of the shielding pipe and dimensions of the drawn-out portions of the terminal fittings described above differ from set values.

SUMMARY

Disclosed embodiments were made based on the above-described circumstances, and it is an object thereof to provide a holder capable of determining the positions of terminal fittings drawn out from the shielding pipe.

According to embodiments, there is provided an electric wire holder for holding electric wires connected to terminal fittings at end portions of the wires, the holder configured to attach to a shielding pipe to cover an edge of the shielding pipe into which the electric wires are inserted and from which the terminal fittings and a portion of the electric wires are drawn out to an outside of the shielding pipe, the holder comprising: a first holding piece configured to hold the portion of the electric wires that is drawn out from the shielding pipe and to fix a draw-out position of the terminal fittings.

The holder according to embodiments is a holder to be attached to a shielding pipe so as to cover an edge of the shielding pipe into which electric wires connected to terminal fittings at end portions thereof are inserted and from which the terminal fittings and a portion of the electric wires are drawn out to the outside, the holder being provided with a projecting holding piece configured to hold the portion of the electric wires that is drawn out from the shielding pipe and to fix a draw-out position of the terminal fittings.

According to embodiments, a holding piece provided on the holder can hold the drawn-out portions of the electric wires. Thereby, even when the shielding pipe is bent later, the positions of the drawn-out terminal fittings are not displaced in bending processing. Moreover, the holder protects coatings of electric wires from an edge formed at the end of the shielding pipe, and since the holding piece is provided when using this holder, the effect that the number of parts is not increased can be also provided.

DETAILED DESCRIPTION

Disclosed embodiments will be described below with reference to the accompanying drawings. The following embodiments are exemplary embodiments and are not intended to limit the technical scope of this disclosure.

In preferred embodiments, the holder has a configuration in which the holding piece extends in a direction in which the electric wires are drawn out, and is configured to be wound with a tape together with the electric wires, the holding piece being formed such that a root side of the holding piece is thicker than its front end side.

In this manner, with the configuration in which the strength of the root side of the holding piece is enhanced, when the electric wires are wound with a tape and are held, it is possible to suppress the situation that the holding piece collapses and is deformed toward the inside.

In embodiments, the holder may have a configuration in which the holder includes an attaching portion that is formed in a cylindrical shape capable of being fitted into the shielding pipe, a portion of the attaching portion being provided with a locking piece that can be locked to a mounting hole provided in the shielding pipe, said portion being flexible; and a covering portion that projects outward in a radial direction from an open end of the attaching portion in a flange shape and that is configured to cover an edge of the shielding pipe, in which the holding piece is disposed at the position displaced from the locking piece in a circumferential direction.

With such a configuration, since the holding piece and the locking piece are disposed at the positions that are displaced in a circumferential direction, if the holding piece is bent and deformed when holding the electric wires, the bending hardly affects the locking piece and therefore, it is possible to suppress the situation that the holder comes off the shielding pipe unexpectedly.

In preferred embodiments, a projecting piece for preventing the tape from being displaced is formed on at least one end portion, with respect to a longitudinal direction, of the holding piece.

With such a configuration, even if the adhesion of the tape is reduced due to deterioration with time, displacement of the tape is prevented by the projecting piece, and therefore, it is possible to stably hold the tape at the initial position for a long period of time.

In embodiments, an outer surface of the holding piece may be provided with a displacement preventing surface that slopes up toward one end side in a longitudinal direction and prevents a displacement of the tape.

With such a configuration, even if the tape deteriorates with time, it is possible to prevent displacement of the tape by the upslope formed on the displacement preventing surface.

Next, exemplary embodiments will be described with reference to the drawings.

Figure 1:
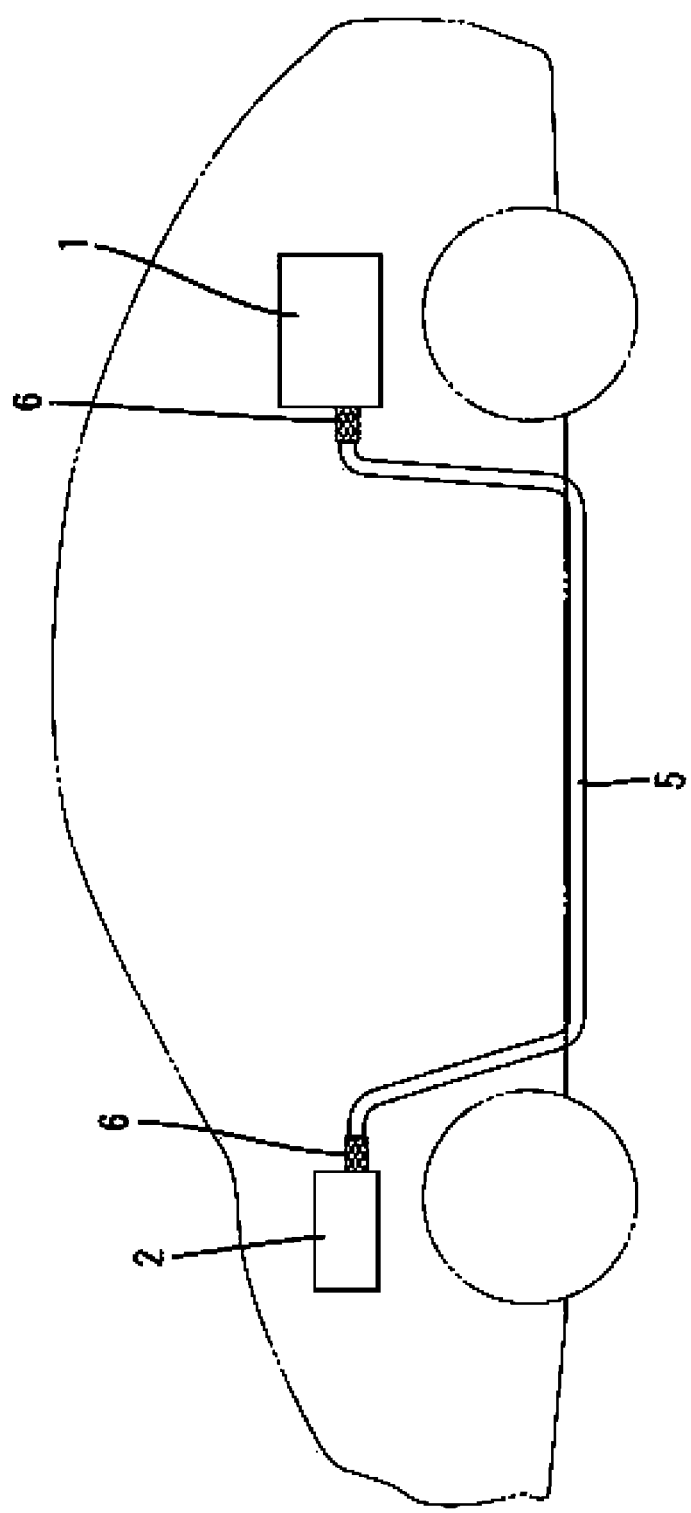
FIG. 1 is a drawing illustrating a routed state of a wire harness according to first embodiment.
Figure 2:
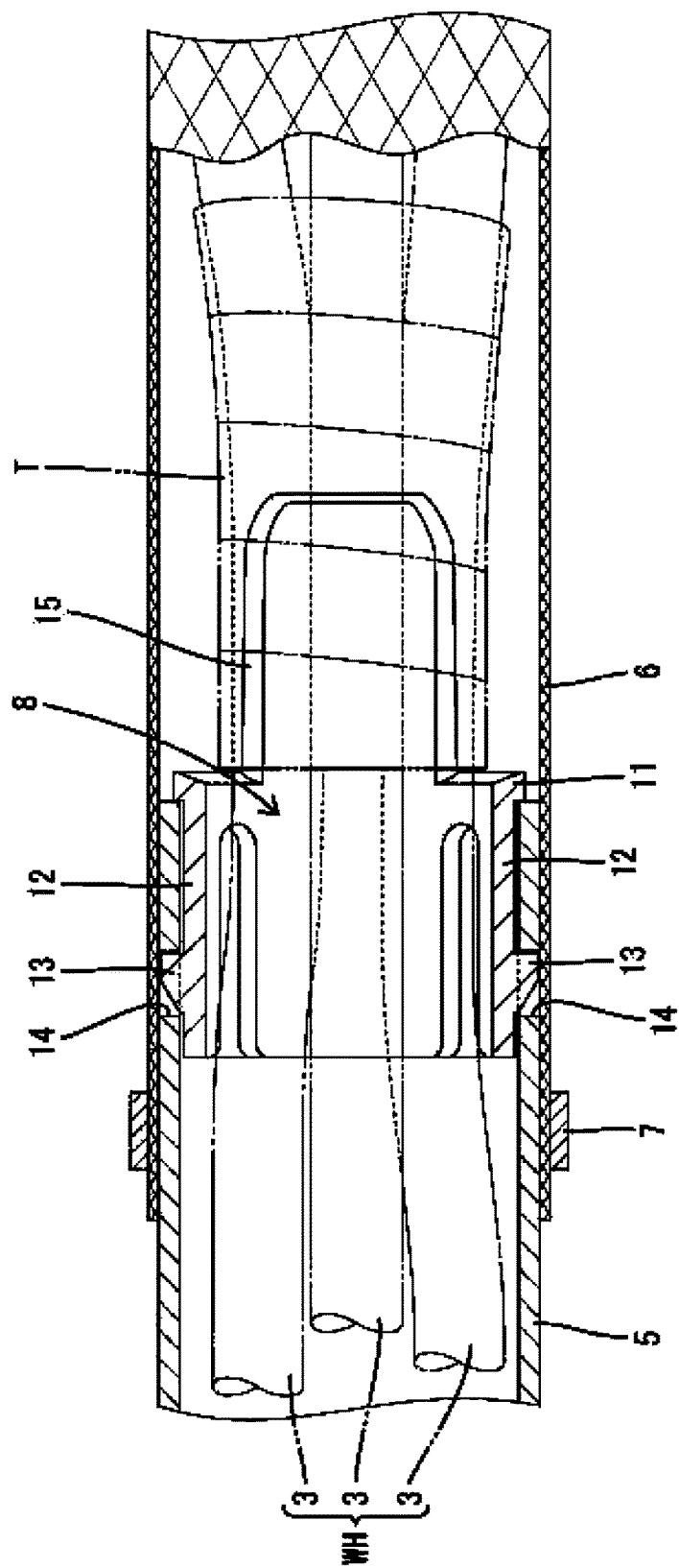
FIG. 2 is a cross-sectional view illustrating the periphery of an attachment portion of a holder.
Figure 7:
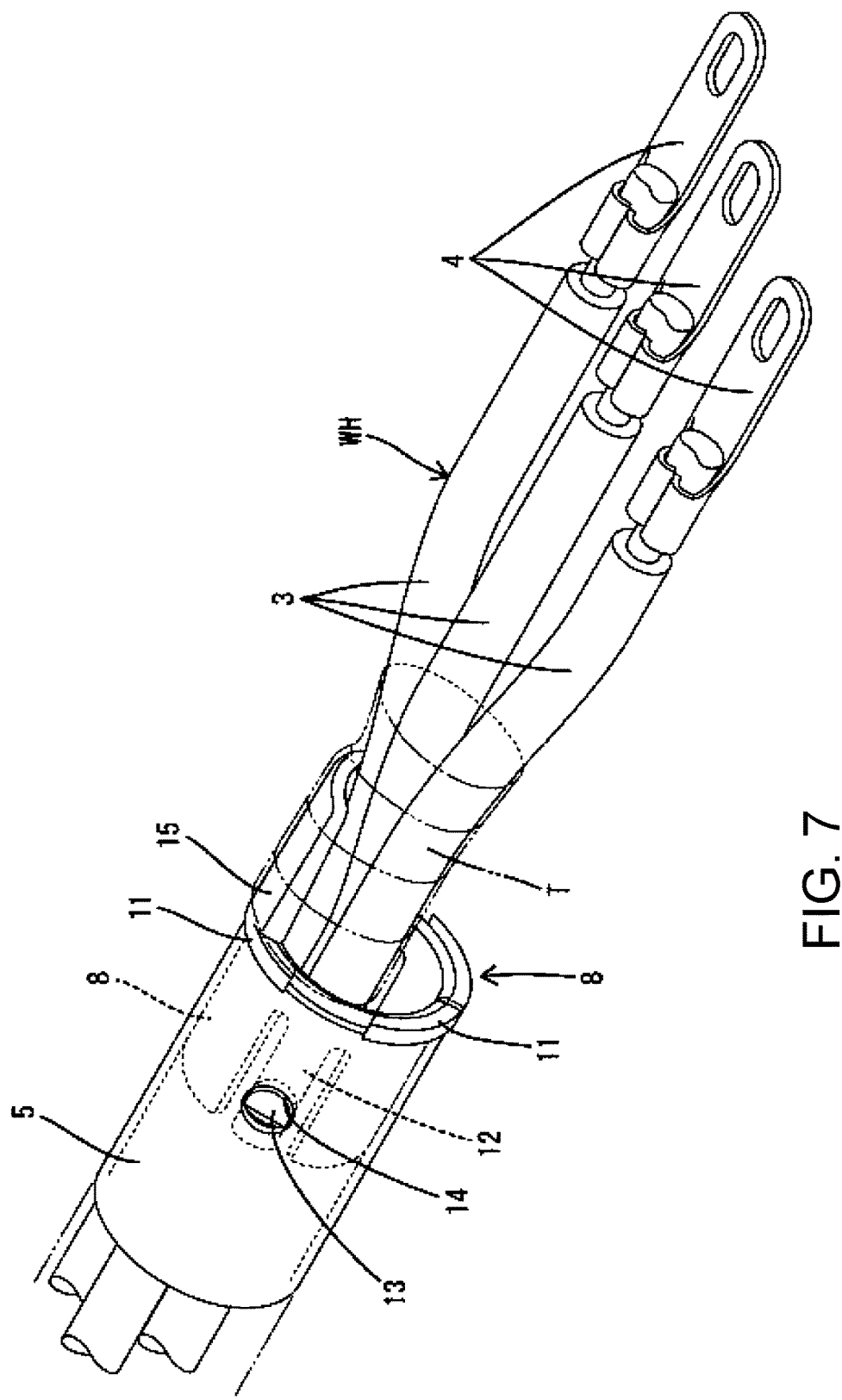
FIG. 7 is a perspective view illustrating a state where electric wires are wound with a tape together with a holding piece.

FIGS. 1 and 2 show the routing state of a wire harness WH connecting a battery 1 that is mounted in the rear portion of a vehicle and an inverter 2 that is mounted in an engine room and is disposed adjacent to a motor (not shown) in a hybrid vehicle or an electric car according to a first embodiment. The wire harness WH includes electric wires 3. The number of wires 3 is not particularly limited by this disclosure and may include 1, 2, 3, 4, 5, 6, 7, 8, 9 or 10 or more wires. In disclosed embodiments, there are 3 wires. As shown in FIG. 7, terminal fittings 4 are connected to the end portions of the electric wires 3.

As shown in FIG. 1, with the exception of its two end portions, the entire wire harness WH is inserted into a shielding pipe 5 made of a conductive metal material. The metal material may be, for example, aluminum. The shielding pipe 5 is disposed under the floor of a vehicle, and is bent into a predetermined shape. Both end portions of the wire harness WH are drawn out to the outside from the shielding pipe 5 and the drawn-out portions are inserted into braided wires 6. The braided wires 6 connect both end portions of the shielding pipe 5 to the battery 1 and the inverter 2. The braided wire 6 is formed by braiding a large number of metal wires into a tubular shape. As shown in FIG. 2, the braided wire 6 is connected to the shielding pipe 5 by crimping a known crimping ring 7 made of metal that is fitted to its end portion.

Next, a holder 8 according to this embodiment will be described. The holder 8 is attached to the end portion of the shielding pipe 5 and has a function of protecting coatings of the electric wires 3 from an edge formed at the end of the shielding pipe 5 by covering the end of the shielding pipe 5.

Figure 3:
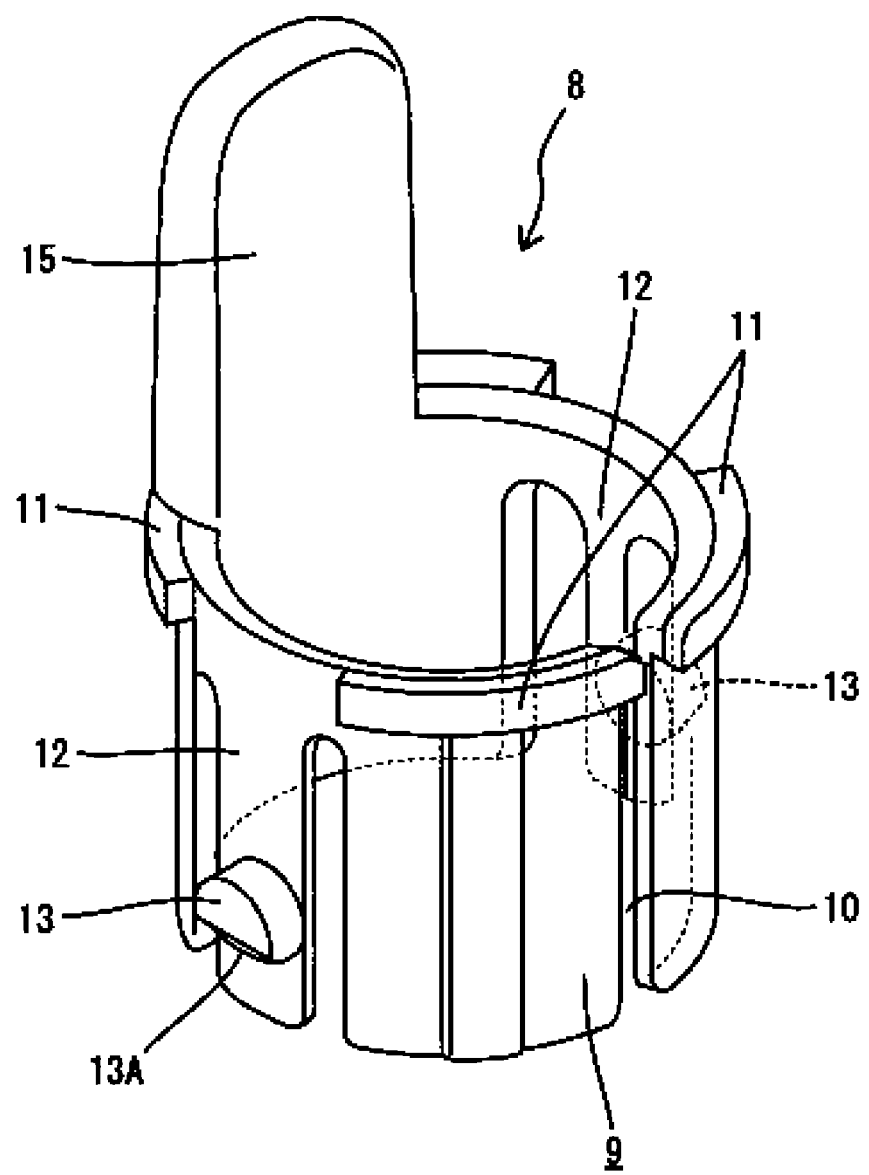
FIG. 3 is a perspective view of the holder.

The holder 8 is made of a single piece of synthetic resin material. As shown in FIG. 3 for example, the holder 8 has a tubular main portion 9 that is fitted to the inside of the shielding pipe 5 in substantially a tight contact state. An expanding slot 10 is formed by cutting the main portion 9 at one position in axial direction. Thereby, when being fitted to the shielding pipe 5, the holder 8 is permitted to be elastically deformed in a diameter reducing direction so as to reduce the groove width of the expanding slot 10.

Figure 5:
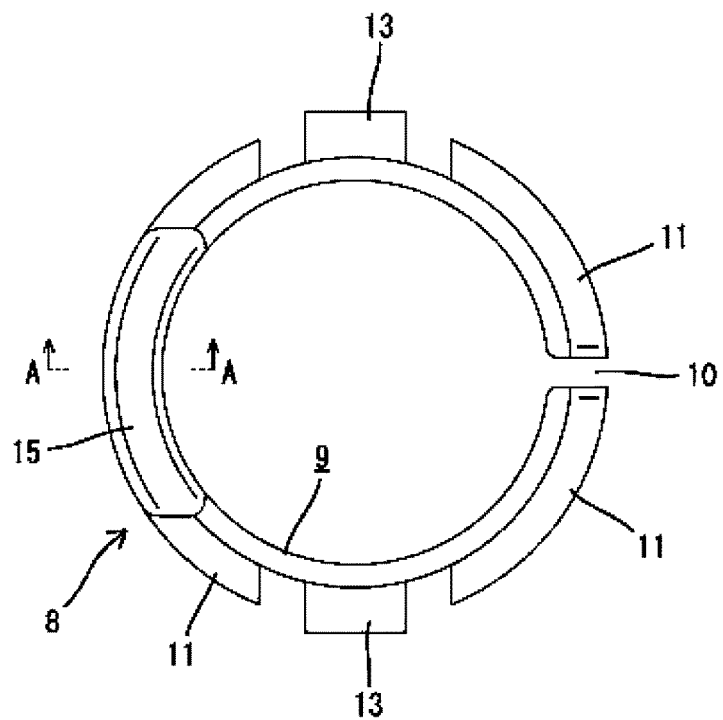
FIG. 5 is a plan view of the holder.

In the main portion 9, a covering portion 11 that projects outward in a radial direction in a flange shape and is divided into a plurality of pieces is formed at an open end on the opposite side of the direction in which the holder 8 is fitted into the shielding pipe 5. As shown in FIG. 2, the covering portion 11 is formed so as to be capable of covering the end edge of the shielding pipe 5 in a state where the holder 8 is attached to the shielding pipe 5. However, as shown in FIG. 5, for molding reasons, the covering portion 11 is not formed in the regions where locking pieces 12 described next are formed.

Figure 4:
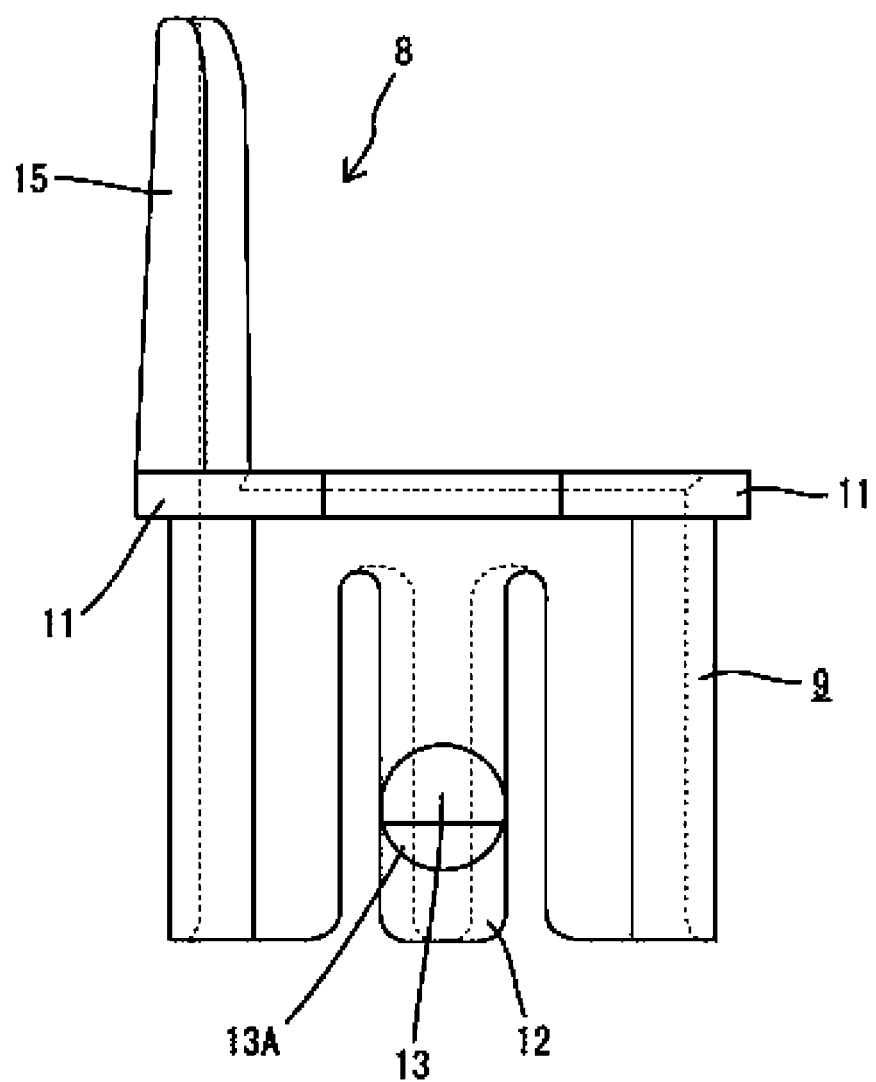
FIG. 4 is a side view of the holder.

In the main portion 9, a pair of locking pieces 12 are formed at positions displaced from the expanding slot 10 by approximately 90° in mutually opposed circumferential directions, as shown in FIGS. 3 and 4. Both sides of the locking pieces 12 are cut in axial direction to form slits, and thereby, the locking pieces 12 are formed in a cantilever shape in which the end portion on the side where the covering portion 11 is formed is a fixed end. The locking pieces 12 have substantially the same length as the main portion 9, and their inner circumferential surfaces and outer circumferential surfaces are formed in an arc shape so that they are substantially flush with the inner circumferential surface and outer circumferential surface of the main portion 9. Moreover, locking projections 13 project from the outer surfaces of the locking pieces 12 near their free ends.

The locking projections 13 can be locked to a pair of mounting holes 14 that are formed by penetrating the shielding pipe 5 at the positions corresponding to the locking projections 13 at its end portion. As shown in FIG. 7, the mounting holes 14 are formed in a circular shape. The locking projections 13 are formed to have an outer circumference with a circular shape, matching with the mounting holes 14 and so that they can be fitted thereto. Moreover, a half region of the locking projection 13 in a direction in which the holder is fitted to the shielding pipe 5 (fitting direction) slopes down in the fitting direction, forming a guiding portion 13A that guides the locking piece 12 to be bent and deformed toward its inside.

In the holder 8, a holding piece 15 projects from the side opposite to the above-described expanding slot 10, with the axis being arranged between the holding piece 15 and the slot 10, that is, at the position displaced from the locking pieces 12 by approximately 90° in circumferential direction. That is, the holding piece 15 is integrally formed to extend from the end surface of the covering portion 11 in a direction opposite to the direction in which the holder is fitted to the shielding pipe 5. As shown in FIG. 7, the holding piece 15 extends from the end portion of the shielding pipe 5 in a direction in which the electric wires 3 are drawn out when the holder 8 is attached to the shielding pipe 5.

Figure 6:
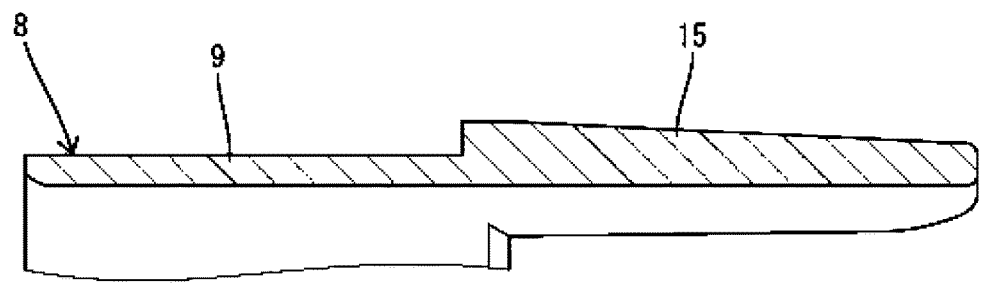
FIG. 6 is a cross-sectional view taken along A-A line in FIG. 5.

The holding piece 15 of this embodiment is formed such that its width is gradually reduced toward its front end. Moreover, both the inner circumferential surface and the outer circumferential surface of the holding piece 15 are arc faces that are coaxial with the main portion 9. The inner circumferential surface of the holding piece 15 is substantially flush with the inner circumferential surface of the main portion 9, and the outer circumferential surface thereof is substantially flush with the outer circumferential edge of the covering portion 11. Furthermore, as shown in FIG. 6, the holding piece 15 is formed such that the thickness of its root side is large and its thickness is gradually reduced toward its front end. Although the holding piece 15 is wound with a tape T together with the wire harness WH drawn out from the shielding pipe 5 (as shown in FIG. 2) the strength of the holding piece 15 itself is set to an extent that the holding piece 15 is not easily bent and deformed toward the inside when being wound with the tape T.

Next, the effects of the first embodiment configured as described above will be discussed with reference to FIG. 2.

When the wire harness WH is routed, the holder 8 is attached to the end portion of the shielding pipe 5 in a straight state before the bending processing. That is, when the main portion 9 of the holder 8 is fitted into the shielding pipe 5 from its end portion, the locking projections 13 of the locking pieces 12 are fitted to the corresponding mounting holes 14 and locked thereto. Thereby, the holder 8 is attached to the shielding pipe 5 while preventing it from coming off. In that state, the wire harness WH is inserted into the shielding pipe 5 and the electric wires 3 are drawn out from the end portion together with the terminal fittings 4. At this time, the positions of the terminal fittings 4 drawn out from the shielding pipe 5 are adjusted.

Next, the electric wires 3 are wound with the tape T together with the holding piece 15 and the positions of the drawn-out terminal fittings 4 are fixed. Then, the predetermined bending processing is performed on the shielding pipe 5. Conventionally, the wire harness WH used to be drawn into the inside of the shielding pipe 5 in this bending processing and the positions of the drawn-out terminal fittings 4 would be displaced from the initial positions. However, in this example, the electric wires 3 are wound with the tape T together with the holding piece 15, and therefore, the positions of the drawn-out terminal fittings 4 do not change in the bending processing performed on the shielding pipe 5 and the terminal fittings 4 are held at the initial set positions as they are. Accordingly, when the terminals are crimped in postprocessing, it is possible to prevent the displacement from the initial positions.

Thereafter, when the end portion of the shielding pipe 5 is inserted into one end of the braided wire 6 and the crimping ring 7 is crimped thereto, the connection of the braided wire 6 is achieved, and then, the terminal fittings 4 are connected to the inverter 2 or the battery 1.

As described above with respect to this embodiment, the positions of the terminal fittings 4 drawn out from the shielding pipe 5 can be fixed by winding the electric wires 3 connected to the terminal fittings 4 with the tape T together with the holding piece 15 of the holder 8. Accordingly, even when the shielding pipe 5 is later bent, it is possible to prevent the positions of the drawn-out terminal fittings 4 from being displaced in the bending processing. Further, the holder 8 protects the coatings of the electric wires 3 from an edge formed at the end of the shielding pipe 5, and since the holding piece 15 is provided when using this holder 8, there is no need to increase the number of parts.

Moreover, with the configuration in which the strength of the root side of the holding piece 15 is enhanced, when the electric wires 3 are wound with the tape T and are held, it is possible to suppress a situation that the holding piece 15 collapses and is deformed toward the inside. If the holding piece 15 is bent and deformed toward the inside, there is a possibility that the lock is released as a result of the locking pieces 12 being bent as well, but it is possible to prevent such a situation in this embodiment.

Furthermore, in this embodiment, since the holding piece 15 is disposed at the position displaced from the locking pieces 12 by approximately 90° in a circumferential direction, even if the holding piece 15 is bent and deformed when being wound with the tape T, the holder 8 is hardly affected by the bending of the holding piece 15 with the arrangement as described above. Accordingly, it is possible to reliably eliminate the situation that the lock of the holder 8 is inadvertently released.

Figure 8:
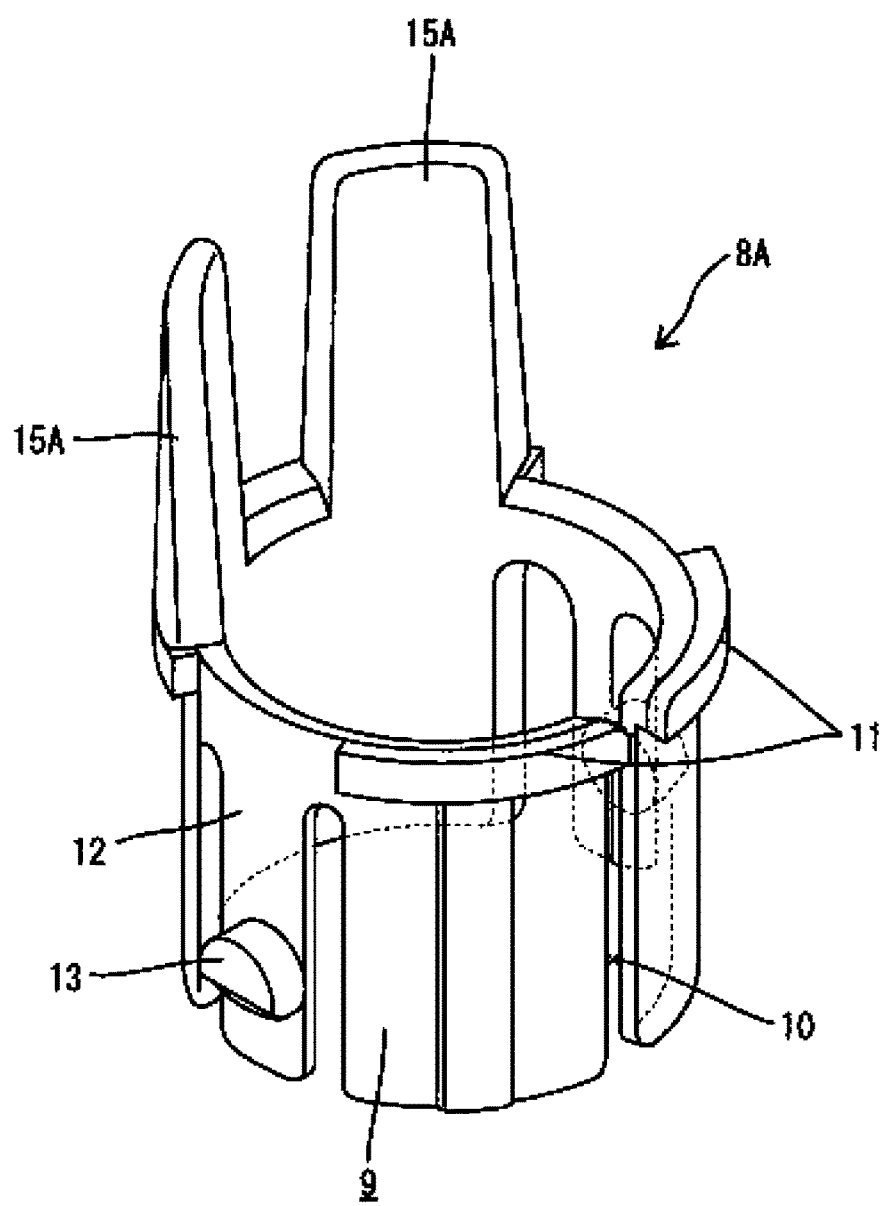
FIG. 8 is a perspective view of a holder according to a second embodiment.

FIG. 8 shows a holder 8A according to a second embodiment. In this embodiment, two holding pieces 15A are formed on the side opposite to the expanding slot 10. The two holding pieces 15A are adjacently disposed with an appropriate gap between the two holding pieces 15A in a circumferential direction. Providing the two holding pieces 15A in this manner makes it possible to increase the area for holding the electric wires 3, and the strength is more easily secured in a state where the holding piece is divided into two than in a state where the holding piece is simply enlarged.

The remaining structure is the same as that of the first embodiment, and therefore, the second embodiment can exhibit the same effect as that of the first embodiment.

Figure 9:
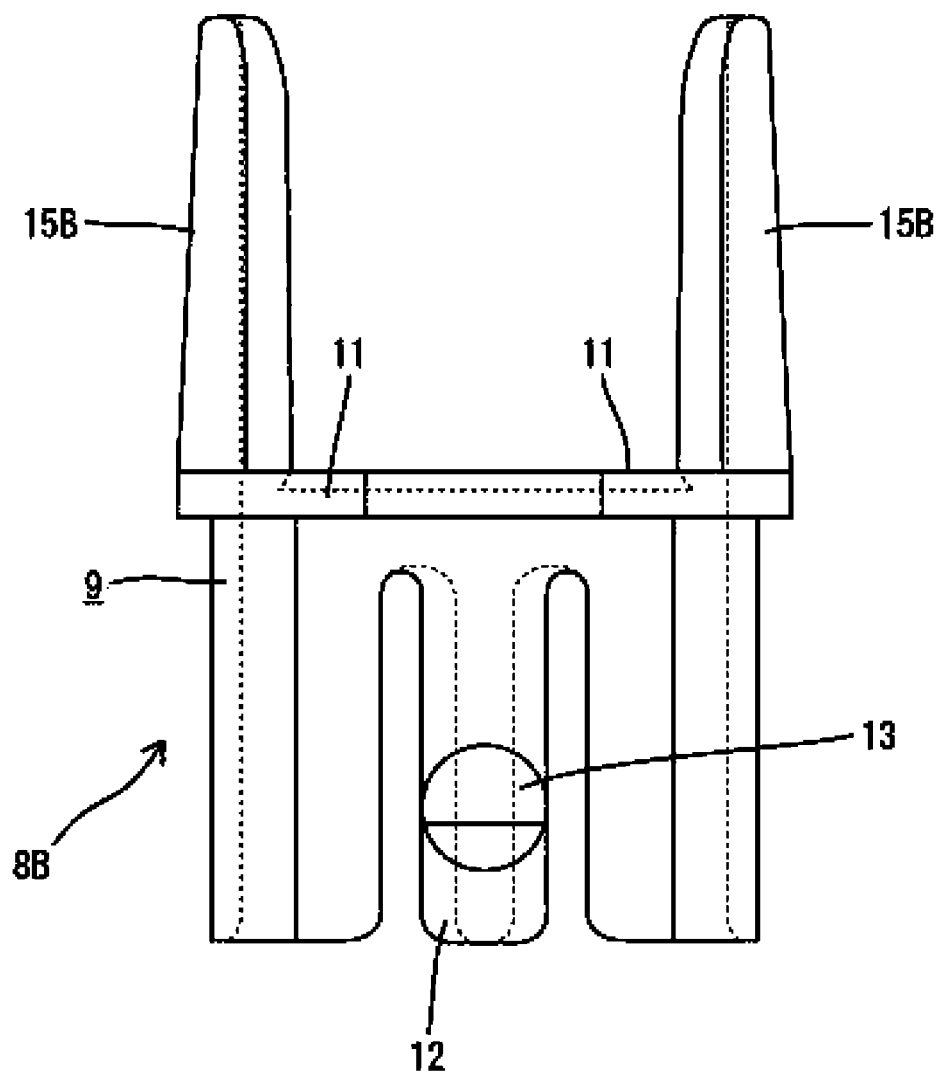
FIG. 9 is a side view of a holder according to a third embodiment.

FIG. 9 shows a holder 8B according to a third embodiment. In this embodiment, a pair of holding pieces 15B are disposed at positions facing each other. Specifically, since the holding pieces 15B are disposed at the positions displaced from the locking pieces 12 by 90° in a circumferential direction, no expanding slot 10 is formed in this embodiment.

The holder 8B configured in this manner can hold the wire harness WH in the axial portion of the shielding pipe 5. The remaining structure is the same as that of the first embodiment, and therefore, the third embodiment can exhibit the same effect as that of the first embodiment.

Figure 10:
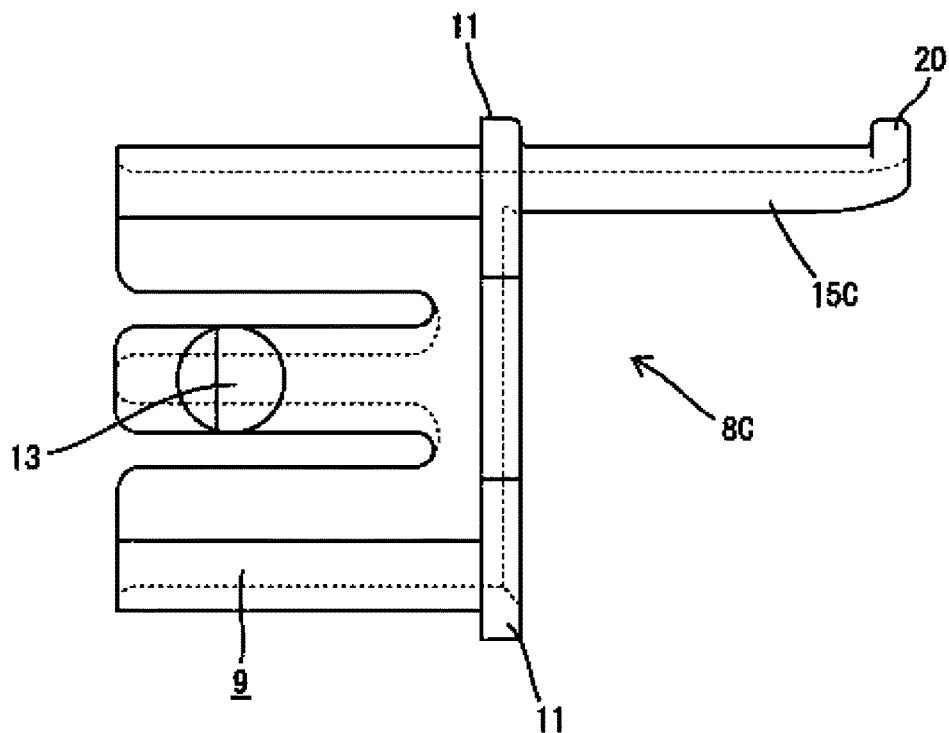
FIG. 10 is a side view of a holder according to a fourth embodiment.

FIG. 10 shows a holder 8C according to a fourth embodiment. In this embodiment, a projecting piece 20 is formed at the front end portion (one end portion in longitudinal direction) of a holding piece 15C, projecting upward in a hook shape. Moreover, a portion of the covering portion 11 described above projects about as high as the projecting height of the projecting piece 20 on the other end portion side (end portion on the root side) in the longitudinal direction.

Thereby, even if the tape T wound on the outer circumferential surface of the holding piece 15C deteriorates with time and its adhesion is reduced, the tape T is positioned between the covering portion 11 and the projecting piece 20. Accordingly, the tape T cannot be displaced to either longitudinal direction and can be held in its initial position.

The remaining structure is the same as that of the first embodiment, and therefore, the fourth embodiment can exhibit the same effect as that of the first embodiment.

Figure 11:
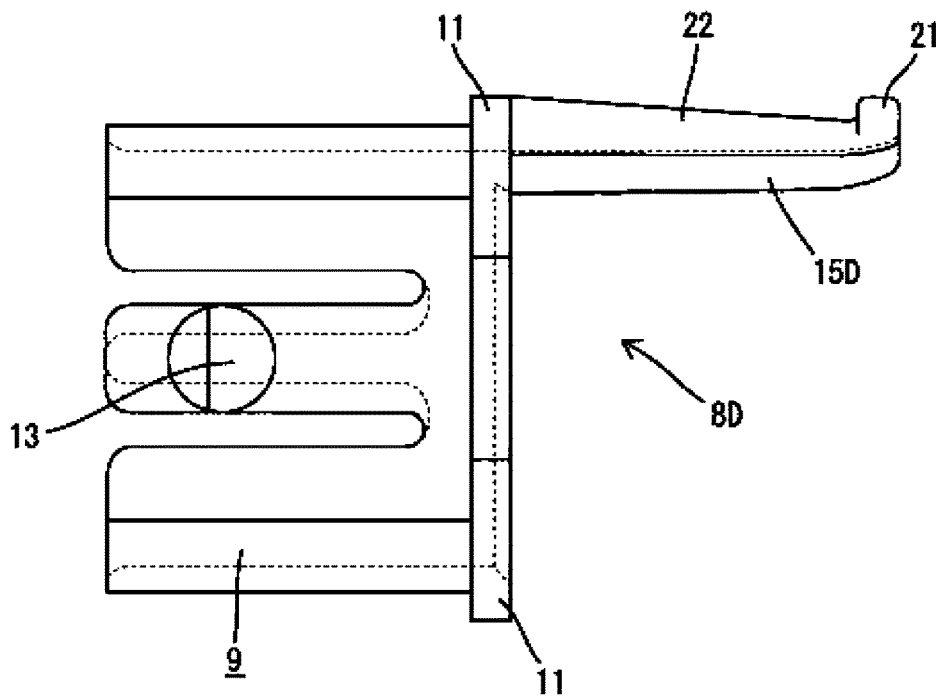
FIG. 11 is a side view of a holder according to a fifth embodiment.

FIG. 11 shows a holder 8D according to a fifth embodiment. In Example 5, the projecting piece 21 for preventing the tape T from being displaced is formed at the front end of a holding piece 15D and a displacement preventing surface 22 that slopes up from the projecting piece 21 side toward the covering portion 11 side is formed on the outer surface of the holding piece 15D.

With this embodiment configured as described above, in the same manner as in the fourth embodiment, even if the tape T deteriorates with time, the displacement of the tape T in a direction toward the front end side is prevented by the projecting piece 21, and the displacement of the tape T in a direction toward the covering portion side is prevented by the upslope formed on the displacement preventing surface 22.

The remaining structure is the same as that of the first embodiment, and therefore, the fifth embodiment can exhibit the same effect as that of the first embodiment.

The disclosure is not limited to the examples and embodiments explained by the above description and the drawings. For example, variations including, but not limited to, those explained below are also contemplated and included in the technical scope of this disclosure.

Although, in the above embodiments, the electric wires 3 are held by being wound with the tape T together with the holding piece 15, 15A or 15B, the electric wires 3 may be held by being wound with a bundling tie instead of the tape T.

Although, in the above embodiments, the locking pieces 12 are locked to the shielding pipe 5 from the inner circumferential side, the locking pieces 12 may be locked thereto from the outer circumferential side.

Although, in the above embodiments, the thickness of the root side of the holding piece 15, 15A or 15B is large in order to secure its strength, reinforcing ribs may be formed on the outer surface of the holding piece 15, 15A or 15B instead or in addition to it.

The shielding pipe may be bent not only by machining but also by hand.

It will be appreciated that the above-disclosed embodiments, or alternatives thereof, may be desirably combined into different systems or methods. Also, various alternatives, modifications, variations or improvements may be subsequently made by those skilled in the art, and are also intended to be encompassed by the following claims. As such, various changes may be made without departing from the spirit and scope of this disclosure as defined in the claims.

What is claimed is:

1. An electric wire holder for holding electric wires connected to terminal fittings at end portions of the wires, the holder comprising:
    a first holding piece configured to hold the portion of the electric wires that is drawn out from a shielding pipe and to fix a draw-out position of the terminal fittings;
    an attaching portion that is formed in a cylindrical shape configured to fit and lock into the shielding pipe, the attaching portion comprising a main portion and at least one flexible locking portion disposed on the main portion; and
    a covering portion that projects outward in a radial direction from an open end of the attaching portion in a flange shape and that is configured to cover an edge of the shielding pipe, the covering portion being formed in a first region other than a region where the at least one flexible locking portion is disposed on the main portion, wherein both sides of the at least one locking portion have axially extending slits thereby, and the first region is not axially-aligned with the axially extending slits disposed on the main portion.

2. The electric wire holder according to claim 1, wherein the first holding piece extends in a direction in which the electric wires are drawn out, and is configured to be wound with a tape together with the electric wires, the first holding piece being formed such that a root side of the first holding piece is thicker than a front end side of the first holding piece.

3. The electric wire holder according to claim 1, wherein the first holding piece is disposed at a position displaced from a position where the attaching portion is locked into the shielding pipe in a circumferential direction.

4. The holder according to claim 1, wherein the first holding piece comprises a projecting portion for preventing a tape from being displaced, the projection portion being formed on at least one end portion, with respect to a longitudinal direction, of the first holding piece.

5. The holder according to claim 1, wherein the first holding piece comprises an outer surface configured to prevent a displacement of a tape in a longitudinal direction.

6. The holder according to claim 5, wherein the outer surface slopes up toward one end side.

7. The holder according to claim 1, further comprising a second holding piece.

8. The holder according to claim 7, wherein the first holding piece and second holding piece are disposed in positions directly facing one another.

9. The holder according to claim 1, further comprising an expanding slot formed by cutting the main portion at one position in an axial direction.

10. The holder according to claim 1, wherein the at least one flexible locking portion comprises a locking piece configured to lock into a mounting hole disposed in the shielding pipe.

11. The holder according to claim 1, wherein the first holding piece is displaced from the at least one flexible locking portion by about 90°.

12. The electric wire holder according to claim 1, wherein the covering portion projects outward in the radial direction from directly contacting the open end of the main portion in the flange shape and is configured to directly cover the edge of the shielding pipe.

13. An electric wire holder for holding electric wires connected to terminal fittings at end portions of the wires, the holder comprising:
    a first holding piece configured to hold the portion of the electric wires that is drawn out from a shielding pipe and to fix a draw-out position of the terminal fittings;
    an attaching portion that is formed in a cylindrical shape configured to fit and lock into the shielding pipe, the attaching portion comprising a main portion and at least one flexible locking portion disposed on the main portion; and
    a covering portion that projects outward in a radial direction from an open end of the attaching portion in a flange shape and that is configured to cover an edge of the shielding pipe, the covering portion being formed in a first region other than a region where the at least one flexible locking portion is disposed on the main portion and formed so as to not overlap axially or circumferentially with the at least one flexible locking portion, wherein both sides of the at least one locking portion have axially extending slits thereby, and the first region is not axially-aligned with the axially extending slits disposed on the main portion.

14. An electric wire holder for holding electric wires connected to terminal fittings at end portions of the wires, the holder comprising:
    a first holding piece configured to hold the portion of the electric wires that is drawn out from a shielding pipe and to fix a draw-out position of the terminal fittings;
    an attaching portion that is formed in a cylindrical shape configured to fit and lock into the shielding pipe, the attaching portion comprising a main portion including a body portion extending axially and at least one flexible locking portion extending axially and disposed circumferentially adjacent to the body portion; and
    a covering portion that projects outward in a radial direction from an open end of the attaching portion in a flange shape and that is configured to cover an edge of the shielding pipe, the covering portion being formed in a first region other than a region where the at least one flexible locking portion is disposed on the main portion, wherein both sides of the at least one locking portion have axially extending slits thereby, and the first region is not axially-aligned with the axially extending slits disposed on the main portion.

15. The electric wire holder according to claim 14, wherein the axially extending slits separate the at least one flexible locking portion from the body portion.

\* \* \* \* \*